June 13, 1967 W. R. MOONEYHAN 3,325,698
ELECTRICAL CAPACITOR ELECTRODE AND METHOD
OF MAKING THE SAME
Filed Jan. 15, 1964

Inventor,
William R. Mooneyhan,
by Sidney Greenberg
His Attorney.

United States Patent Office 3,325,698
Patented June 13, 1967

3,325,698
ELECTRICAL CAPACITOR ELECTRODE AND
METHOD OF MAKING THE SAME
William R. Mooneyhan, Columbia, S.C., assignor to General Electric Company, a corporation of New York
Filed Jan. 15, 1964, Ser. No. 337,910
7 Claims. (Cl. 317—230)

The present invention relates to electrical capacitors, and more particularly to electrolytic capacitors with novel electrode structure and a method of making the same.

The use of powdered film-forming metal particles such as tantalum for making electrodes is well known in the electrolytic capacitor art, such material usually being compressed into the desired shape and density and sintered to form a porous electrode member. In the past, the metal powder has generally been produced by methods which yield irregular, jagged particles having sharp edges. Such particles have heretofore been considered desirable in order to obtain the maximum amount of surface area to provide maximum capacitance per unit volume of capacitor. It has been found, however, that capacitor electrodes composed of such metal particles are subject to certain disadvantages, in that the unsymmetrical, sharp-pointed particles give rise during operation of the capacitor to high and irregular electrostatic field stresses which may lead to poor electrical properties and premature breakdown of the capacitor. Also, because of the irregular shape of the particles, the density, pore size and capacitance per unit volume of electrodes made therefrom are not uniform throughout the body of the electrode and are difficult to control in the manufacture of such electrodes.

It is an object of the invention to provide improved electrolytic capacitors and a method of making the same which overcome the above disadvantages.

It is another object of the invention to provide improved electrode structures for electrical capacitors which are characterized by uniform pore size and distribution, which provide improved electrical properties and stability thereof under widely varying conditions, and which may be made by simple and economical process by which such characteristics are readily controlled.

Other objects and advantages will become apparent from the following description and the appended claims.

With the above objects in view, the present invention relates to an electrolytic capacitor comprising a pair of electrodes, at least one of which consists of a porous mass of film-forming metal in open-celled foam-like form of controlled highly uniform porosity and density and substantially free of carbon reaction products of decomposion of organic materials, the porous foam-like metal electrode having throughout a dielectric oxide film formed on the surfaces thereof.

The invention will be better understood from the following description taken in conjunction with the accompanying drawing, in which.

Figure 1:
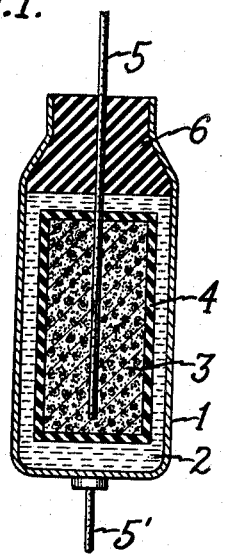
FIGURE 1 is a cross-sectional view in elevation of an electrolytic capacitor embodying the present invention.

Referring now to the drawing, and particularly to FIGURE 1, there is shown an electrolytic capacitor comprising a casing 1 serving as the cathode and containing a liquid electrolyte 2 such as glycol/borate, lithium chloride or sulfuric acid in which an anode 3 is immersed. Casing 1 may be made of silver or any other metal which does not adversely affect the electrolyte or become corroded thereby. Anode 3 in accordance with the invention is made of foam metal as hereinafter more fully described. While the preferred anode metal is tantalum, any other suitble film-forming metal such as niobium, aluminum, titanium, or alloys of such metals with each other and other metals may be used.

As used herein, "foam metal" means an integral piece of metal having a foam or sponge-like, open-cell structure with uniform pore size and distribution. The term "metal" as used in the claims is intended to include alloyed and unalloyed metals and metal compounds.

A lead wire 5 made of the same metal as anode 3 or other film-forming metal is embedded in the body of anode 3 and passes to the exterior of casing 1 through an insulating sealing plug 6 around which the upper end of casing 1 is crimped to provide a fluid-tight closure for the capacitor. At the opposite end of the capacitor, a cathode lead 5' is suitably joined by welding or otherwise to the outside of casing 1.

The surfaces of the foam metal forming the mass of anode 3 are provided with a thin anodic dielectric oxide film by subjecting anode 3 to an anodizing treatment, in accordance with processes well known in the electrolytic capacitor art. The anodic dielectric oxide thus formed is shown schematically in FIGURE 1 as layer 4, it being understood that in reality such a film actually coats all the surfaces throughout the foam metal mass.

Figure 2:
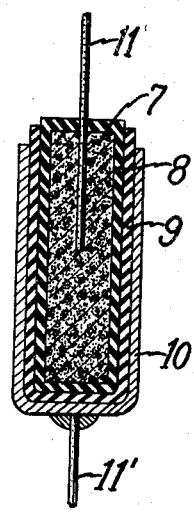
FIGURE 2 is a similar view of another type of capacitor which may embody the present invention.

The invention is particularly applicable to solid electrolyte type capacitors such as disclosed, for example, in British Patent 747,051. Shown in schematic form in FIGURE 2 is such a solid electrolyte capacitor, comprising a porous anode 7 composed of a film-forming foam metal similar to anode 3 of FIGURE 1, an anodic dielectric oxide film 8 on the surfaces of the foam metal anode, a layer 9 of semi-conductive material such as $MnO_2$, and an outer coating 10 of conductive material such as graphite serving as the counter electrode or cathode. Layers 8, 9 and 10 are shown on the outside of anode body 7 for clarity of illustration, it being understood that actually the described superimposed layers overlie all the interior surfaces of foam metal anode 7 as well as its exterior surfaces, as a result of the processing of a porous anode body in producing such coatings, without adversely affecting the density or porosity of the foam metal or uniformity thereof. Lead wire 11 is embedded in anode 7 and cathode lead wire 11' is joined by suitable means at the other end of the capacitor unit to cathode layer 10.

Figure 3:
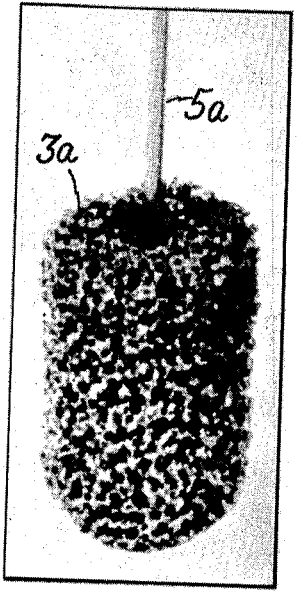
FIGURES 3 and 4 are photographs of foam metal electrodes of the invention at a magnification of 6×
Figure 4:
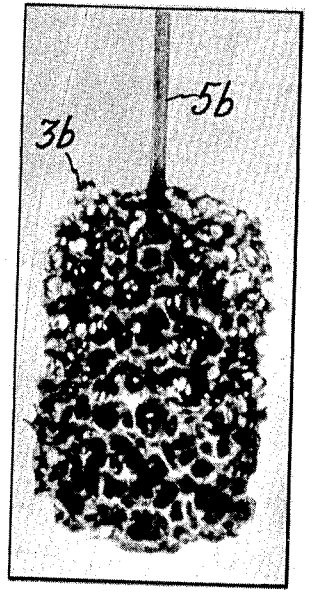

FIGURES 3 and 4 are photographs of tantalum foam electrodes made in practicing the invention, the anodes shown being magnified six times. In FIGURE 3 the anode structure shown comprises a tantalum anode body 3a in which a tantalum lead wire 5a is inserted. The foam or sponge-like nature of anode 3a is readily seen from the photograph, the structure being a porous open-celled mass having, in the case of the FIGURE 3 anode, 60 pores per linear inch. The FIGURE 4 anode similarly is a foam-like open cell foam metal mass but having 35 pores per linear inch. Typically, such foam metal anodes have a cylindrical shape about 0.210 inch diameter and 0.540 inch length, the lead wire usually being 0.25 inch diameter by 1.00 inch length. The weight of a typical anode of this type ranges from 0.3 to 0.45 gram at a density in the range of 1.0 to 2.0 grams per cc.

A preferred process of making the foam metal electrode, stated briefly, comprises impregnating a porous organic structure with a suspension of a powdered metal in a liquid, drying the impregnated organic structure, inserting a wire lead into the dried impregnated structure, heating the impregnated structure to decompose the organic structure and the liquid while retaining the shape and size of the original organic structure, and then further heating the remaining powdered metal structure to fuse the powder metal particles into a continuous, open-cell, porous mass of uniform porosity and density.

Numerous methods are known in the art for making organic foam materials of many shapes and pore sizes which may be used in practicing the present inevntion, and the particular method of producing such organic foam material or the specific composition thereof forms no part of the present invention. Examples of disclosures of such foam materials are found in U.S. patents, Simon et al., 2,772,245, 2,772,246, and 2,798,054; Talalay, 2,786,038; Carlson, 2,797,443, and Dennis 2,906,643.

The method employed in the invention may be used to make porous electrodes of any shape and size and of a large selection of pore sizes simply by first making the desired size and shaped structure in the form of an organic skeletal structure such as a foam of the type widely described in the literature and commercially available in many forms and materials.

A method of making porous metal material which may be utilized in practicing the present invention is disclosed in the patent to Ball, 3,111,396, issued Nov. 19, 1963, and assigned to the same assignee as the present invention, and the disclosure of this patent is incorporated by reference herein.

In a preferred method employed in practicing the present invention, a porous organic structure is selected in the form of a cured foamed synthetic resin such as an open pore type of polyurethane, polystyrene, cellulose or isocyanate sponge. A slurry is made of a liquid and a finely divided film-forming metal, e.g., tantalum. The slurry may incorporate an organic binder material, although such a binder is not always essential. It is generally desirable to include in the slurry a small amount of some type of decomposable agent such as a thickening agent, a metal hydride, or a salt which will perform or provide for some binding action. The binding agent need not be foamable because, although the method described herein produces an electrode in the form of a foamed body, no foaming steps take place in the process of the invention. Of particular importance is the incorporation in the slurry of an agent for removal of the carbon produced as a result of the decomposition of the organic foam substrate. For this purpose, such materials as magnesium oxide and tantalum pentoxide are added as a part of the slurry composition. During the heat treatment described herein, the oxygen of these compounds reacts with and removes the carbon residue.

The selected organic structure is then saturated with the slurry composition as thoroughly as possible. Excess slurry can then be removed from the pores or open portions, such as by squeezing, leaving only the matrix of the organic structure impregnated or its walls thoroughly coated with the slurry. One of the easier methods of accomplishing impregnation of the sponge structure is by soaking it in the liquid slurry (as a sponge in water) until it has been infiltrated with or impregnated by the slurry. The impregnated wet organic structure is then squeezed between rolls to remove excess slurry and is slowly dried at or near room temperature. It is then subjected to a series of successively higher temperatures under a preselected protective or reactive atmosphere until the powder used in the original slurry fuses or sinters or in some way joins to produce a bonded structure.

A broad example of these successively higher heating steps includes first heating to a temperature sufficient to reduce the organic cellular or porous structure and the liquid vehicle employed in the slurry substantially to carbon but below that temperature which would cause too rapid charring resulting in the destruction of the shape of the material or rupture of the internal structure. The material at this point in the process is a carbon structure, substantially all of the internal portions of which are at least coated with the powder of the original slurry. This structure is then heated to a second or intermediate temperature high enough to join the powder with at least a relatively weak bond as well as to assure full carbonization of the organic structure. The fully carbonized, weakly bonded structure is then heated at a third temperature sufficiently high to further join or sinter the powder into a foam product.

In most cases, it is desirable that the heat treating or sintering phase be carried out in a reducing atmosphere such as dry hydrogen. In the case of refractory materials an inert atmosphere such as argon or helium can be used. Refractory metals such as tantalum and niobium and the like require additional heat treatment which can be conducted in a vacuum. However, because of oxidation of metals at elevated temperatures, it is generally undesirable to conduct the higher temperature phases of the sintering or further joining process in air. A brief exposure is preferred at the maximum processing temperature, after which the specimen is cooled under a reducing or inert atmosphere and then removed from the protective atmosphere.

Virtually any size, shape, porosity or degree of ductility can be produced in a porous metal or metal alloy by careful selection of materials used in the method employed in the present invention. For example, the size, shape, number and condition of the pores of the organic porous structure or skeleton initially impregnated will govern many of the physical and mechanical characteristics of the final product. In addition, a careful choice of powder to be placed into a slurry will govern the type of matrix desired in the final article. Furthermore, a careful selection of a binding agent which can or cannot react with the product can result in either a hard or soft, brittle or ductile material, as desired.

The vehicles which with the powder forms the slurry includes both binders and thinners. They carry the powder into the central portion of the skeletal organic structure and when necessary hold the powders in place until a temporary bond is developed. When the vehicle is a material other than water, it is preferable to use one which either depolymerizes or is decomposable to form a substantially pure carbon residue. In some instances only water is required as a vehicle because some metal compounds such as the salts contribute sufficient binding action themselves. Only that amount of thinner or binder is required which is sufficient to carry the desired amount of powder into the skeletal structure. Examples of thinners, in addition to water, are acetone and toluene. With the more volatile thinners such as acetone, it is sometimes necessary to add thinner from time to time in addition to that originally incorporated in order to maintain the proper degree of slurry fluidity.

Binder materials which can be used in the vehicle include various resins such as silicones, epoxy, phenolic, gum cellulose gel, the methacrylates such as methyl methacrylate and those used in slip-casting such as ammonium algenate, polyvinyl alcohol, and the like. A binder which has been found particularly satisfactory in that it does not react in any way with the metal powders but forms a high percentage of carbon in the structure is a colorless liquid corn sugar syrup. Such a syrup has a viscosity and surface tension which aids in the suspension of some of the higher density powders while providing sufficient carbon upon decomposition for a good carbon structure.

In general, a preferred range of metal powder is 1–11 parts by weight to 1 part of binder and a preferred approximate composition of the slurry is, by weight, 40–49% metal powder, 6–43% binder (when a separate binder is used), and 7–36% thinner.

The foam metals which may be prepared in accordance with the described process have a preferred density range of about 0.008–0.03 pound per cubic inch.

The following specific procedure is set forth below to illustrate the method of making foam type capacitor electrodes, it being understood that the invention is not intended to be limited in any way thereby.

Cylindrical forms were cut from formed polyurethane material having 60 pores per inch and 5/8 inch thick. A slurry was prepared of the following composition:

Tantalum powder (5 micron) _____ 50 grams.
Tantalum pentoxide (high purity) _____ 14.4 grams.
Corn syrup (Karo) _____ 9.0 grams.
Water _____ About 2 ml.

The ingredients were blended and mixed to produce a smooth flowing slurry. The polyurethane foam cylinders were dipped and squeezed in the slurry bath to ensure complete saturation of the slurry into the foamed cylinders. After each foamed cylinder was fully saturated with the slurry it was removed from the slurry bath and squeezed firmly to remove excess slurry and it was blotted once between two sheets of absorbent tissue paper to remove excess slurry clinging to its surface. The thus-prepared foam units were air dried for 30 minutes.

Tantalum lead wires were cut from 25 mil wire and one end of each lead wire was sharpened. They were then etched in an etching solution composed of a mixture of sulphuric acid, hydrofluoric acid, and nitric acid, after which they were rinsed in water and acetone, and air dried. After being annealed under vacuum at 2100° C., the lead wires were inserted with their sharpened ends into the dried foam units. The units with the leads thus inserted were presintered in an inert atmosphere at temperatures increasing over a two hour period from 300° C. to 950° C., and then cooled to room temperature. Thereafter, the pre-sintered foam units were subjected to a sintering treatment under vacuum with the furnace temperature increased as rapidly as possible to about 1400° C., which temperature was maintained for an hour and then increased rapidly to about 1895° C., and the units were sintered at this temperature for 1½ hours. The intermediate temperature heat treatment at 1400° C. has been found important for enabling the oxide-carbon reaction to take place for carbon removal, which is essential to produce high purity electrodes of good electrical properties. Best results are obtained when the time required to reach the 1400° C. temperature does not exceed 15 minutes.

As a result of the described heat treatments, the organic base structure and slurry vehicle are entirely decomposed or depolymerized, the carbonaceous residue of the organic materials is oxidized and removed, and any oxide on the remaining metal is reduced. Also as a result, the metal powder particles are fused together and form a porous open-celled metallic structure having a uniform porosity and density corresponding to that of the original organic foam structure.

At this point the foam anodes may be used as prepared, or further steps may be taken to increase the electrical volumetric efficiency. The anode may now, or, alternatively, after the 950° C. presintering step, be reimpregnated with slurry. This would have the effect of filling the pores with a spongy metal mass and have the effect of greatly increasing the effective surface area of the anode.

The foam electrodes thus produced may be anodized to provide anodic dielectric oxide films in accordance with procedures well known in the art. In general, acid solutions in distilled water may be used as the film-forming electrolyte, and as an example solutions of phosphoric acid in concentrations of .01% to 10% by weight may be employed for this purpose. Examples of other materials which may be used in aqueous film-forming electrolyte solutions include boric acid, nitric acid, sulfuric acid, propionic acid, oxalic acid, and ammonium salts of phosphoric, nitric, sulfuric and boric acid. Ethylene glycol may be added to such solutions to reduce evaporation at elevated temperatures and to improve their wetting characteristics. The film forming process is normally carried out in two stages with the electrode in the forming electrolyte bath: applying constant current with increasing voltage and then applying constant voltage with decreasing current. When the current decay rate decreases to a predetermined level, the film formation is complete, and the filmed foam electrodes are removed, washed and dried. The electrodes may then be further processed for use in liquid or solid electrolytic capacitors by conventional methods.

There is thereby produced in accordance with the invention capacitor electrodes of highly uniform porosity and density which provide improved electrical properties and stability thereof under widely varying conditions and which are made by a simple and economical process which makes it possible to closely control the physical and electrical characteristics of electrodes thus made.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. The method of making electrodes for electrical capacitors which comprises the steps of impregnating a porous organic foam structure with a suspension of a finely divided film-forming metal in a fluid, drying the thus impregnated organic foam structure, heating the dried impregnated organic foam structure to decompose the organic structure and the fluid to provide a metal structure closely retaining the shape and size of the original organic foam structure, reimpregnating said metal structure with said suspension, heating said metal structure to decompose the organic structure of said suspension heating the remaining film-forming foam metal structure, at an increased temperature to further join the particles of metal into a continuous form characterized by highly uniform porosity and density, and thereafter providing a dielectric film on the surfaces throughout the thus produced foam metal electrode.

2. The method of making electrodes for electrical capacitors which comprises the steps of impregnating a porous organic foam structure with a suspension of a finely-divided film-forming metal in a fluid, slowly drying the thus impregnated organic foam structure, heating the dried impregnated organic foam structure at a temperature increasing from about 300° C. to about 950° C. reimpregnating said structure with said suspension, heating said structure to dry said fluid, thereafter heating the remaining foam structure under vacuum at a temperature increasing from about 1400° C. to about 1895° C., thereafter cooling the thus produced foam metal structure, and thereafter providing a dielectric oxide film on the surfaces of the thus produced foam metal electrode.

3. The method of making electrodes for electrical capacitors which comprises the steps of impregnating a porous organic foam structure with a suspension of a finely-divided film-forming metal in a fluid, said suspension comprising a binder material and having a powder-to-binder ratio in the range of 1–11 parts by weight of powder to 1 part of binder, slowly drying the thus impregnated organic foam structure, heating the dried impregnated organic foam structure at a temperature increasing from about 300° C. to about 950° C., repeating the said reimpregnation drying and both said heating steps heating the remaining foam structure under vacuum at a temperature increasing from about 1400° C. to about 1895° C., cooling the thus produced foam metal structure, and thereafter providing a dielectric oxide film on the surfaces of the thus produced foam metal electrode.

4. The method of making electrodes for electrical capacitors which comprises the steps of impregnating a porous organic foam structure with a suspension of a finely-divided tantalum film-forming metal in a fluid, said suspension also comprising a binder and a tantalum oxide compound, slowly drying the thus impregnated organic foam structure, heating the dried impregnated organic foam structure at a temperature increasing from about 300° C. to about 950° C., heating the remaining foam structure under vacuum at a temperature increasing from about 1400° C. to about 1895° C., cooling the thus produced foam metal structure, and thereafter providing a dielectric oxide film on the surfaces of the thus produced foam metal electrode.

5. The method of making electrodes for electrical capacitors which comprises the steps of impregnating a porous organic foam structure with a suspension of finely-divided tantalum and tantalum pentoxide in a fluid, slowly drying the thus impregnated organic foam structure, heating the dried impregnated organic foam structure at a temperature increasing from about 300° C. to about 950° C., heating the remaining foam structure under vaccum at a temperature increasing from about 1400° C. to about 1895° C., cooling the thus produced foam tantalum structure, and thereafter electrolytically forming a dielectric oxide film on the surfaces of the thus produced foam tantalum electrode.

6. The method of making electrodes for electrical capacitors which comprises the steps of impregnating a porous organic foam structure with a suspension of a finely-divided film-forming metal in a fluid, drying the thus impregnated organic foam structure, inserting a lead wire into the thus impregnated organic foam structure, heating the dried impregnated organic foam structure to decompose the organic structure and the fluid while closely retaining the shape and size of the original organic foam structure, heating the remaining film-forming foam metal structure to further join the particles of metal into a continuous form characterized by highly uniform porosity and density, and thereafter electrolytically forming a dielectric film on the surfaces throughout the thus produced foam metal electrode.

7. An electrolytic capacitor comprising in combination
 (1) an open ended casing;
 (2) a "foam metal" porous electrode in said casing, said electrode being the resultant product of:
  (a) impregnating a liquid suspension of a film-forming metal powder into a porous organic matrix material,
  (b) partially sintering said powder into a porous body,
  (c) reimpregnating said body with said suspension and,
  (d) sintering said body into the "foam metal" product electrode;
 (3) a film forming metal terminal having one end in sintered connection with said electrode, and the other end projecting through and insulatingly sealed in the open end of said casing;
 (4) a continuous dielectric oxide film electrolytically formed on the exposed and porous surfaces of said electrode; and
 (5) an electrolyte in said casing contacting said dielectric film throughout this area.

References Cited
UNITED STATES PATENTS

| | | | |
|---|---|---|---|
| 2,299,228 | 10/1942 | Gray | 317—230 |
| 2,461,410 | 2/1949 | Clark | 317—230 |
| 3,004,332 | 10/1961 | Werner | 317—230 |
| 3,078,552 | 2/1963 | Grandey | 75—222 |
| 3,111,396 | 11/1963 | Ball | 75—222 |
| 3,144,328 | 8/1964 | Doty | 75—222 |
| 3,166,693 | 1/1965 | Haring | 317—230 |

JAMES D. KALLAM, *Primary Examiner.*